United States Patent [19]

DeYoung et al.

[11] Patent Number: 5,427,602
[45] Date of Patent: Jun. 27, 1995

[54] REMOVAL OF SUSPENDED PARTICLES FROM MOLTEN METAL

[75] Inventors: David H. DeYoung, Export, Pa.; Grant G. Owen, Rockdale; Dennis R. Moeller, Taylor, both of Tex.; K. Dean Vinnedge, Bettendorf, Iowa

[73] Assignee: Aluminum Company of America, Pittsburgh, Pa.

[21] Appl. No.: 287,165

[22] Filed: Aug. 8, 1994

[51] Int. Cl.[6] .................................................. C22B 9/02
[52] U.S. Cl. ........................................ 75/412; 75/407
[58] Field of Search ........................... 75/407, 411, 412

[56] References Cited

U.S. PATENT DOCUMENTS

| | | | |
|---|---|---|---|
| 2,840,463 | 6/1958 | Stroup | 75/681 |
| 2,863,558 | 12/1958 | Brondyke et al. | 75/412 |
| 3,025,155 | 3/1962 | Lee et al. | 75/412 |
| 3,039,864 | 6/1962 | Hess et al. | 75/409 |
| 3,737,303 | 6/1973 | Blayden et al. | 75/412 |
| 3,737,304 | 6/1973 | Blayden et al. | 75/412 |
| 3,737,305 | 6/1973 | Blayden et al. | 75/412 |
| 3,893,917 | 7/1975 | Pryor et al. | 75/411 |
| 3,962,081 | 6/1976 | Yarwood et al. | 75/412 |
| 4,024,056 | 5/1977 | Yarwood et al. | 75/412 |
| 4,024,212 | 5/1977 | Dore et al. | 75/412 |
| 4,067,731 | 1/1977 | Chia | 75/412 |
| 4,075,303 | 2/1978 | Yarwood et al. | 75/412 |
| 4,081,371 | 3/1978 | Yarwood et al. | 75/412 |
| 4,384,888 | 5/1983 | Yu | 75/412 |
| 4,390,364 | 6/1983 | Yu | 75/407 |
| 4,769,158 | 9/1988 | Eckert | 75/412 |
| 4,790,873 | 12/1988 | Gesing et al. | 75/407 |
| 5,122,184 | 6/1992 | Eckert | 75/407 |

FOREIGN PATENT DOCUMENTS

6462265 3/1989 Japan.

Primary Examiner—Peter D. Rosenberg
Attorney, Agent, or Firm—David W. Pearce-Smith

[57] ABSTRACT

Molten metal containing suspended liquid and solid particles is passed preferably generally upwardly through a porous media so constructed and arranged such that the movement of the molten metal therethrough renders the suspended liquid particles gravity separable. The gravity separable liquid particles rise upwardly or settle downwardly so as to be removable from said molten metal for subsequent removal therefrom. An associated apparatus is also provided.

21 Claims, 5 Drawing Sheets

NON WETTING
($\theta > 90°$)

FIG. 8A

WETTING
($\theta < 90°$)

FIG. 8B

TERMINAL RISE VELOCITY OF MOLTEN SALT PARTICLES

REMOVAL OF SUSPENDED PARTICLES FROM MOLTEN METAL

BACKGROUND OF THE INVENTION

This invention relates to separating and removing suspended particles from molten metal by passing the molten metal containing the suspended particles preferably generally upwardly through a porous media. The particles may be either liquid particles or solid inclusions. The porous media is constructed and arranged such that the movement of the molten metal therethrough renders the suspended particles gravity separable.

Molten metal, such as aluminum, including alloys containing over 50% aluminum, has been treated to remove impurities therefrom. Some of these treatments, such as in-furnace fluxing or in-line treatment, generate liquid particles, such as molten salts. Also, additions of salts are often made to furnaces to reduce melt loss. A portion of these molten salts are carried along with the molten metal and, if not removed from the molten metal, can create "oxide patches" on the surface of the solidifying ingot. These oxide patches not only adversely affect ingot quality but also many times have to be scalped off the ingot, which results in a reduction of the recovery of metal in the ingot casting operation. Oxide patches can also cause ingots to crack. In some cases, the oxide patches are so prevalent that the entire ingot must be scrapped and remelted. This, of course, adds cost to the ingot casting operation.

The liquid particles referred to, such as the molten salts, are in the micron size range, typically from less than 1 micron up to 80 or possibly 100 microns in size. The molten salts are usually $MgCl_2$, $NaCl$, $CaCl_2$, $KCl$, $LiCl$ and mixtures thereof. The molten salts can also contain $NaF$, $AlF_3$ and $CaF_2$ originating from furnace additives or potroom metal. Most liquid salts are lighter than the molten metal and would be gravity separable but remain entrained or suspended largely because their small size results in an extremely slow rise velocity. Other than for their small size, the buoyant liquid particles would rise to the surface for removal by skimming or similar operations.

There have been efforts to remove particles, such as solid and liquid inclusions, from molten metal. U.S. Pat. No. 4,390,364 discloses a removal method comprising moving the molten metal containing suspended particles downwardly through a medium of submerged contacting surfaces such as a packed bed. The contacting medium has a high void fraction and a high specific surface area. The patent states that this method results in coalescence or agglomeration of the suspended particles. Afterwards, the molten metal is passed generally downwardly through inclined channels or passages. Buoyant particles and agglomerates collect on the underside of the inclined surfaces and typically move upward in a counter-flow relationship with the metal, where the metal moves laterally and downwardly through the inclined passages. These buoyant particles and agglomerates are removed by skimming or similar operations.

U.S. Pat. No. 4,790,873 discloses a method of removing particles from molten metal by contacting the molten metal with a medium which retains metal-nonwettable inclusions and then passing the molten metal through a filter of metal-wettable material. The metal-wettable material of the filter retains the liquid particles therein. The filter containing the liquid particles is subsequently removed and replaced.

Despite these known methods and apparatus, there remains a need for an improved method for separation and removal of liquid particles from molten metal.

It is an object of the invention to remove particles from molten metal before casting of the molten metal into ingots.

It is a further object of the invention to provide a method and apparatus which creates gravity settlable particles from particles suspended in the molten metal.

It is yet another object of the invention to provide a porous media which is constructed and arranged so as to facilitate coalescence of particles therein for subsequent carrying out by the molten metal and ultimate removal from the molten metal surface by skimming or a like operation.

It is still another object of the invention to provide a liquid particle removal method and apparatus that will result in increasing the useful lifetime of the bed filter and/or other filtration systems used in the casting process.

SUMMARY OF THE INVENTION

In accordance with the invention, molten metal containing particles suspended therein can be treated by passing the same through porous media so constructed and arranged such that the movement of the molten metal therethrough renders the suspended particles gravity separable. Preferably, the molten metal is passed generally upwardly through the porous media. In this way, the gravity separable particles rise upwardly so as to be removable from the molten metal. In one aspect of the invention, the porous media is so constructed and arranged to facilitate coalescence of the suspended particles on the porous media. The coalesced particles are carded out of the porous media by sufficient molten metal velocity and by creating coalesced particles having increased buoyancy over the original smaller suspended particles. The coalesced particles may be formed from both liquid and solid particles.

In an embodiment of the invention, the porous media is made of a porous ceramic material which has preferably 10 to 60 pores per inch and more preferably 20 to 40 pores per inch. In another embodiment the porous media can have an upper portion and a lower portion, the lower portion having more pores per inch than the upper portion. In this way, the lower portion can facilitate coalescence of the particles while the upper portion facilitates carrying away of the coalesced particles out of the porous media. In yet another embodiment of the method, a filter can be provided downstream of the porous media to further capture remaining liquid and solid particles in the molten metal flowing through the filter.

An associated apparatus is also provided which comprises a molten metal passageway having mounted generally horizontally therein a porous media arranged such that the molten metal passes generally upwardly through the porous media. The porous media is so constructed and arranged such that movement of the molten metal therethrough renders the suspended particles gravity separable, whereby the gravity separable particles rise upwardly to the upper surface of the molten metal. The molten metal passageway has an inlet portion upstream of the porous media and a settling zone downstream of the inlet portion. The settling zone has sufficient length in relation to molten metal velocity and depth of molten metal to allow the gravity separable particles to float to the top surface of the molten metal in the settling zone.

BRIEF DESCRIPTION OF THE DRAWINGS

Other features of the present invention will be further described in the following related description of the preferred embodiment which is to be considered together with the accompanying drawings wherein like figures refer to like parts and further wherein.

DETAILED DESCRIPTION OF THE INVENTION

The term "salt" is used herein to mean a compound formed when one or more of the hydrogen atoms of an acid are replaced by one or more cations of the base. Salts may be intentionally added to the molten metal or formed in-situ by the reaction of a fluxing gas, such as chlorine, with elements in the molten metal. Salt which is commonly formed in-situ includes $MgCl_2$ and $KCl_2$. The term salt is also intended to include inorganic carbonates such as $K_2CO_3$. Other salts include magnesium chloride, lithium chloride, potassium chloride, sodium chloride, copper chloride, calcium fluoride, magnesium fluoride, lithium fluoride, potassium fluoride, beryllium fluoride, aluminum fluoride, zirconium fluoride, silica fluoride, titanium fluoride, sulfur hexafluoride and combinations thereof.

The term "halide" is used herein to describe compounds of the type MX where X may be fluorine, chlorine, bromine, iodine or astatine, and M may be any other element.

The method and apparatus of the invention operates in association with the process of casting molten metal, such as aluminum and aluminum alloys, into ingots. As is well known to those skilled in the art, a source of aluminum is provided and melted in a furnace and then transferred to a holding furnace. The molten metal is then often subjected to a fluxing and/or filtering treatment.

The filtering treatment removes entrained solid particles such as aluminum oxide particles. The filtering treatment involves flowing the molten metal through a filter means to physically capture solid and liquid particles, typically oxide particles, and impurities before metal is cast.

The fluxing treatment is used to remove dissolved hydrogen, trapped gas and lower the content of metals such as sodium, calcium, magnesium and lithium and the like. However, when chlorine or chlorine-containing reactants are used, the fluxing treatment can form liquid particles, such as molten salts like $MgCl_2$, within the melt. A fraction of the molten salt in the melt can remain as a very finely divided suspension and can be difficult to remove or separate from the molten aluminum by flotation or gravity separation. That is, even though the molten salt may have a lower density than the aluminum, some remains entrained therein and can pass through the filtering system with the resulting imperfections in the cast aluminum ingot.

Figure 1:
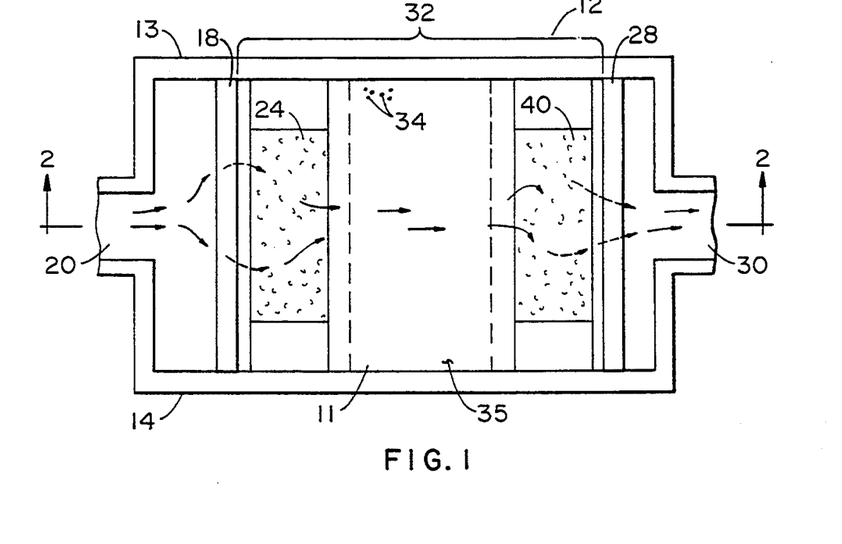
FIG. 1 is a top plan view depicting the operation of the improved system showing one arrangement suitable for practicing the invention.
Figure 2:
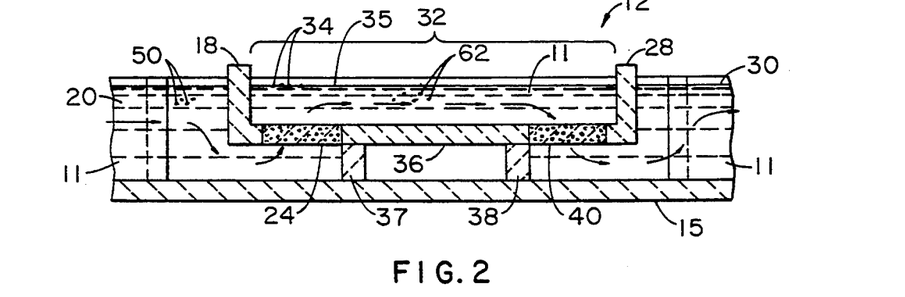
FIG. 2 is a cross-sectional view taken along line 2—2 of FIG. 1.
Figure 3:
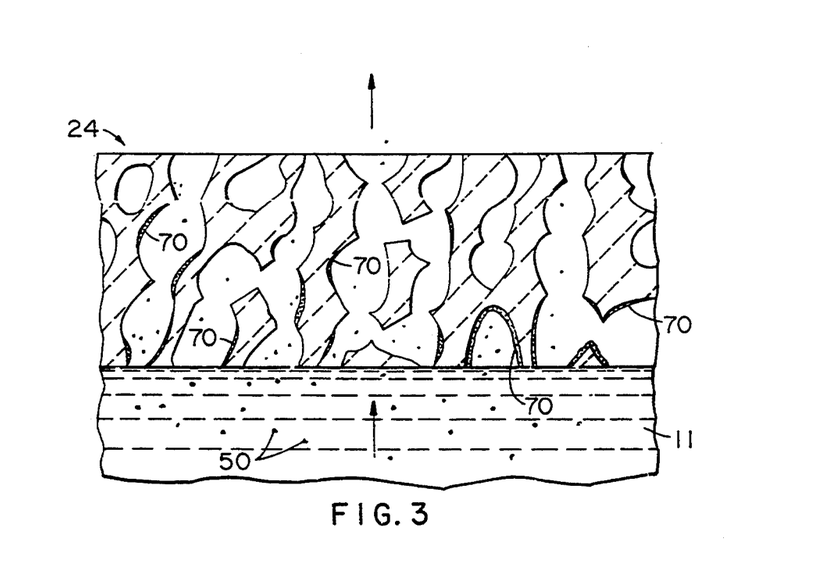
FIGS. 3–6 are enlarged cross-sectional views of the porous media, in a time lapse sequence, showing the coalescing and subsequent release from the media of the liquid particles.

Referring now to FIGS. 1 and 2, the improved liquid particle removal system includes a containment vessel 12 constructed or lined with a suitable refractory material in which the molten metal 11 is contained. The containment vessel 12 includes two sidewalls 13, 14 (FIG. 1) as well as a floor 15 (FIG. 2). A lid (not shown) can be provided to cover the containment vessel 12. An inlet baffle 18 establishes an inlet leg 20 for the flow of molten metal (shown by the arrows in FIG. 1 and 2). A rigid porous ceramic media 24 is mounted generally horizontally in the containment vessel 12 such that the molten metal entering the inlet leg 20 is passed generally upwardly therethrough, as seen best in FIG. 2.

The containment vessel 12 further includes an outlet baffle 28 which establishes an outlet leg 30. The inlet baffle 18 and outlet baffle 28 define a settling zone 32 where the gravity separable liquid particles, shown in FIG. 2 as coalesced liquid particle globules 34, are collected on the upper surface 35 of the molten metal 11. The settling zone 32 includes a floor 36 supported by walls 37 and 38 (FIG. 2) mounted to the floor 15 of the containment vessel 12. A porous ceramic filter 40 is mounted generally horizontally in the floor 36 such that the molten metal in the settling zone area 32 passes generally downwardly therethrough.

Referring more particularly to FIG. 2, in operation, liquid particles 50, typically salt particles less than one micron to possibly fifty microns, are entrained in the molten metal 11 flowing in the inlet leg 20 upstream of the rigid porous ceramic media 24. As used herein, the term "liquid particles" also includes slurries of liquid particles and solids, the solids being less than about fifteen volume percent of the liquid particles. More generally, the term liquid particles means particles which are deformable to the shear forces experienced in conventional trough and filter arrangements. The liquid particles are typically lighter than the molten metal, but are not gravity separable and remain entrained or suspended largely because of the very low rise velocity caused by their small size. The liquid particles can include molten salts such as $MgCl_2$, $NaCl$, $CaCl_2$, $KCl$, $LiCl$ and mixtures thereof. The molten salts can also contain fine solids, such as $NaF$, $AlF_3$ and $CaF_2$ originating from furnace additives or potroom metal. The fluorides, in addition to being solids, can also be dissolved in the molten salt. Furthermore, the liquid particles can be liquid metal phases insoluble in aluminum, such as Pb.

As can be seen by the arrows in FIGS. 1 and 2, the molten metal 11 containing the liquid particles 50 passes generally upwardly through the rigid porous ceramic media 24. As will be explained in greater detail with respect to FIGS. 3 to 6 below, as the liquid particles pass generally upwardly through the rigid porous ceramic media 24, the rigid porous ceramic media 24 renders the liquid particles gravity separable with the gravity separable liquid particles subsequently being released from the media 24. Once released, the liquid particle globules 34, due to their greater buoyancy and the generally upward molten metal flow velocity, float to the top surface 35 of the molten metal 11 in the settling zone 32 as shown in FIG. 2. The liquid particle globules 34 are typically over 50 or 60 microns and as large as 1,000 microns or larger. From there, floating liquid particle globules 34 can be periodically collected and removed from the containment vessel 12 by skimming or other like operations.

As can be seen in FIG. 2, a small percentage of the liquid particles 62 may remain entrained in the molten metal 11 after it is passed through rigid porous ceramic media 24. This can be caused by the fact that some liquid particles may not be coalesced in the rigid porous ceramic media 24 and because, as will be discussed with respect to FIG. 6, as the large coalesced particles are released from the rigid porous ceramic media 24, some smaller diameter droplets of liquid particles can be generated. This happens because in the release process, the film of the liquid particles is ruptured. In order to further remove these liquid particles 62, the molten metal containing these liquid particles optionally can be passed through the porous ceramic filter 40. Liquid particles 62 that remain trapped in the porous ceramic filter 40 can be removed when the filter 40 is replaced, which usually occurs after each casting of molten metal (one casting typically ranging from approximately 40,000 to 250,000 pounds of metal). The porous ceramic filter 40 can also capture remaining solid particles in the molten metal.

Filter 40 can be similar to porous media 24. However, preferably, filter 40 has a greater number of pores per inch (see discussion hereinafter for the meaning of pores per inch) than media 24 to capture the smaller liquid particles that remain entrained in the molten metal 11 after the molten metal 11 is passed through media 24. As porous media 24 effects removal of substantially most of the liquid particles in the molten metal 11, filter 40 is usually not loaded by the liquid particles (as will be explained and shown with respect to FIGS. 4–6) and thus does not create globules of liquid particles that are released therefrom. Filter 40, thus, is used to capture liquid particles which remain entrained in the molten metal 11 after passing generally upwardly through porous media 24.

The invention contemplates using the rigid porous ceramic media 24, which will render gravity separable substantially most of the liquid particles 50 entrained in the molten metal 11 while omitting the use of porous ceramic filter 40. It will be further appreciated that the containment vessel 12 could be configured such that the molten metal will also flow generally upwardly through the porous ceramic filter 40; however, this is not as preferred because this would mean that the settling zone 32 would be shorter (for the same containment vessel length) or the containment vessel size would have to be increased (for the same settling zone length).

The rigid porous ceramic media 24 can be made of several types of materials such as, for example, ceramic foams, bonded ceramic particulate, porous carbon and glasses. The ceramic foam media can be produced by using a polyurethane precursor which is immersed in a ceramic slurry and then fired at a high temperature. During firing, the polymer precursor vaporizes leaving a sintered or fused ceramic media. The bonded ceramic particulate media consists of tabular ceramic media held together by a ceramic binder or by bonds formed by sintering without a binder.

Rigid porous ceramic media is commercially available from various manufacturers such as Hi-Tech Ceramics, Inc. of Alfred, N.Y., sold under the trade name Alucel TM. These media are generally composed of mixtures of oxides such as alumina, zirconia and silica. The alumina filters, in particular, can be sintered or phosphate bonded.

As is known to those skilled in the art, a standard measurement of pore size of a porous ceramic media is described by the number of pores per linear inch or PPI. The PPI of a specific media is determined, for foam media, from the original pore size of the polyurethane foam used as the template. Although a variation in pore size can occur, an average PPI can usually be determined and since the pores are nearly spherical in shape, their size can be represented by an effective diameter. The pore sizes for the media used in the present invention are preferred to be in the range of about 10 to 60 PPI with 20 to 40 PPI being more highly preferred.

Figure 4:
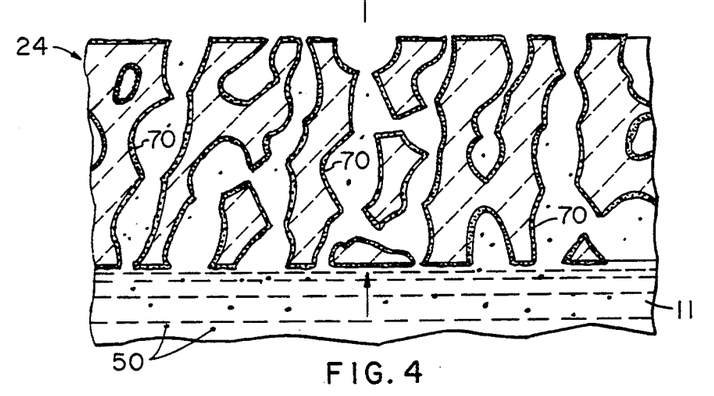
Figure 5:
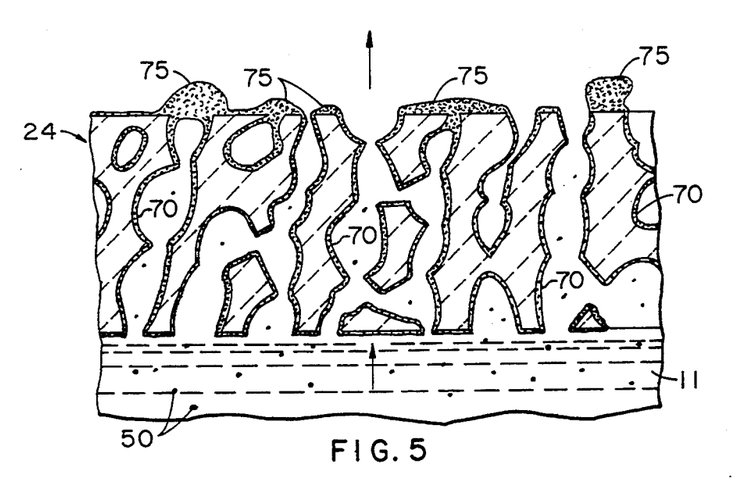
Figure 6:
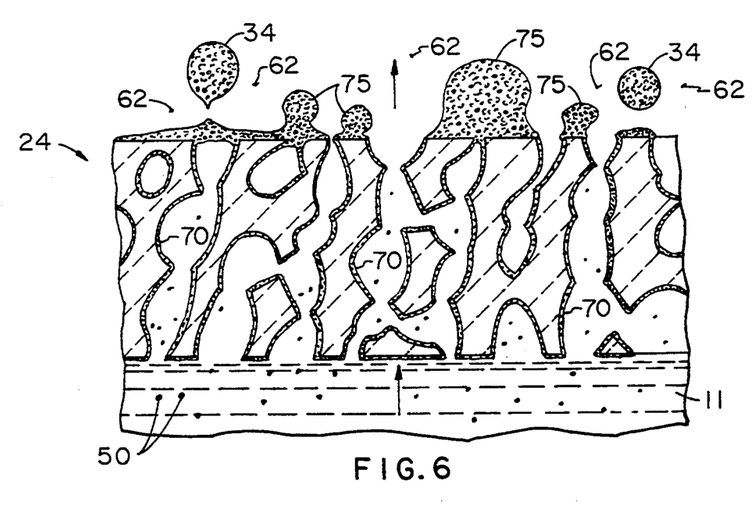

Referring now to FIGS. 3 to 6, a detailed view of the operation of the rigid porous ceramic media 24 is shown. The molten metal 11 containing liquid particles 50 is passed generally upwardly through the media 24 (as indicated by the flow direction arrows), and because the media 24 is wettable by the liquid particles 50, they can wet the media 24 as is shown by the stippled areas 70 on the media 24 in FIG. 3. This wetting will continue until most of the media 24 is wetted as shown in FIG. 4. Once this occurs, the liquid particles will start to move upwardly as a viscous liquid flow by virtue of the molten metal flow and will eventually gather on the upper surface of the media 24 as shown in FIG. 5 by the retained coalesced liquid particles 75. This will continue until the surface effects of the coalescing liquid particles cause the coalesced particles to become buoyant and start to lose contact with the media 24 as shown by coalesced liquid particle globules 34 shown in FIG. 6 and in FIGS. 1 and 2. The size of these coalesced liquid particle globules 34 is on the order of about 100 to 10,000 microns, with most being greater than 500 microns. At this size, the coalesced liquid particle globules 34 are gravity separable and they rise through the molten metal 11 in the settling zone 32. It can also be seen from FIG. 6 that some smaller liquid particles, such as particles 62 (see also FIG. 2), can be released when the larger liquid particle globules 34 are released. This is believed to result because in the release process, the film of the liquid particles is ruptured which creams these smaller liquid particles 62. Nonetheless, the amount of such smaller liquid particles 62 is drastically reduced below the amount of smaller liquid particles 50 carried by the molten metal entering the system.

Figure 7:
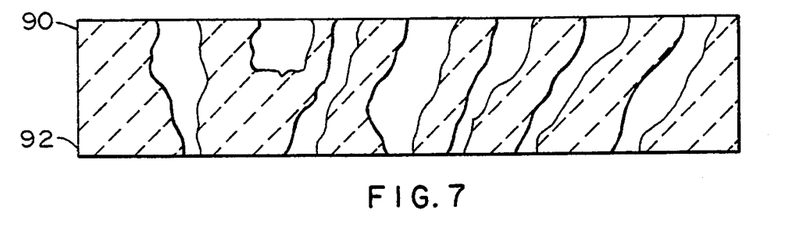
FIG. 7 is a schematic drawing showing a porous media with an upper portion and a lower portion having different pore sizes.

Referring now to FIG. 7, in another embodiment, the ceramic media can consist of an upper portion 90 and a lower portion 92, the upper portion having fewer average PPI (such as 10 to 20 PPI) than the lower portion (such as 30 to 40 PPI). In this way, the liquid particles are captured more easily on the lower portion 92 for coalescence and subsequently the coalesced particles can pass more easily through the upper portion 90.

Figure 8A:
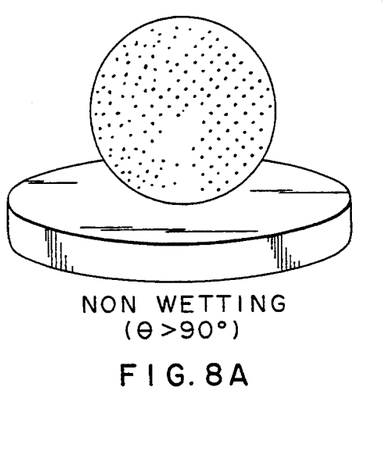
FIG. 8 is a schematic view of two liquid inclusions, showing the difference between a wetting (FIG. 8B) and a non-wetting surface (FIG. 8A).
Figure 8B:
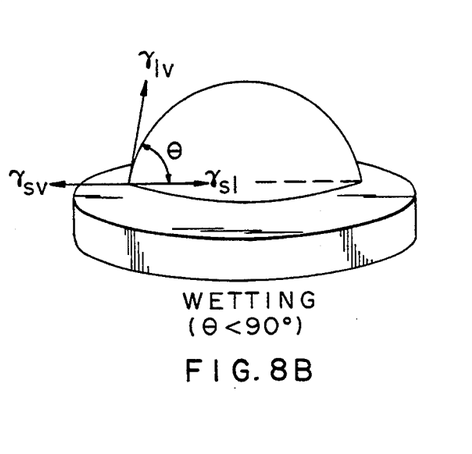

As was mentioned above, the ceramic media is wettable by the liquid particles sought to be removed. One narrow test for determining whether a media is wettable or not involves heating the media to about 600°–700° C. and pouring a heated liquid salt on the media. If the liquid salt beads on the media, the media is non-wettable. If the liquid salt does not bead, the media is wettable. In a narrower test, if the heated liquid salt is poured on a heated media and passes through or spreads (but does not bead) the media is also wettable. A more broad test involves measuring wettability as a function of the interfacial tensions (measured in dynes per centimeter) between the ceramic media, the molten salt and the molten aluminum. FIG. 8 illustrates partially schematically the concept of wettability and non-wettability. The molten salt-solid substrate (in this case the ceramic media) interfacial tension is indicated by the variable $\gamma sl$, the molten salt-molten aluminum interfacial tension is indicated by the variable $\gamma sv$ and the molten aluminum-solid substrate interfacial tension is indicated by $\gamma lv$. If $\gamma sl$ is greater than $\gamma sv$, then the angle $\Theta$, which is determined by the Young-Dupre equation $$\cos\theta = \frac{\gamma sv - \gamma sl}{\gamma lv}$$

will be greater than 90° and the molten salt will be non-wetting toward the substrate. In this case, the molten salt will have no tendency to spread on the ceramic media surface but instead the molten aluminum will spread over the ceramic media in preference to the molten salt. If $\gamma sl$ is less than $\gamma sv$, then $\Theta$ will be less than 90° and the molten salt will be wetting toward the substrate and the molten salt, as opposed to the molten aluminum, will tend to spread over the ceramic media surface.

The minimum length of the settling zone 32 (FIGS. 1 and 2) is determined to accommodate gravity settling of the liquid particles to the top surface of the molten metal 11 so that the coalesced liquid particle globules 34 can be skimmed or otherwise removed from the top surface of the molten metal. As can be seen on the graph shown in FIG. 9, the larger the liquid particle globule diameter, the faster the rise velocity. Therefore, for larger particles the settling zone 32 (assuming constant width, depth and metal flow velocity) can be shorter in order for the liquid particle globules to rise to the top surface of the molten metal.

Figure 9:
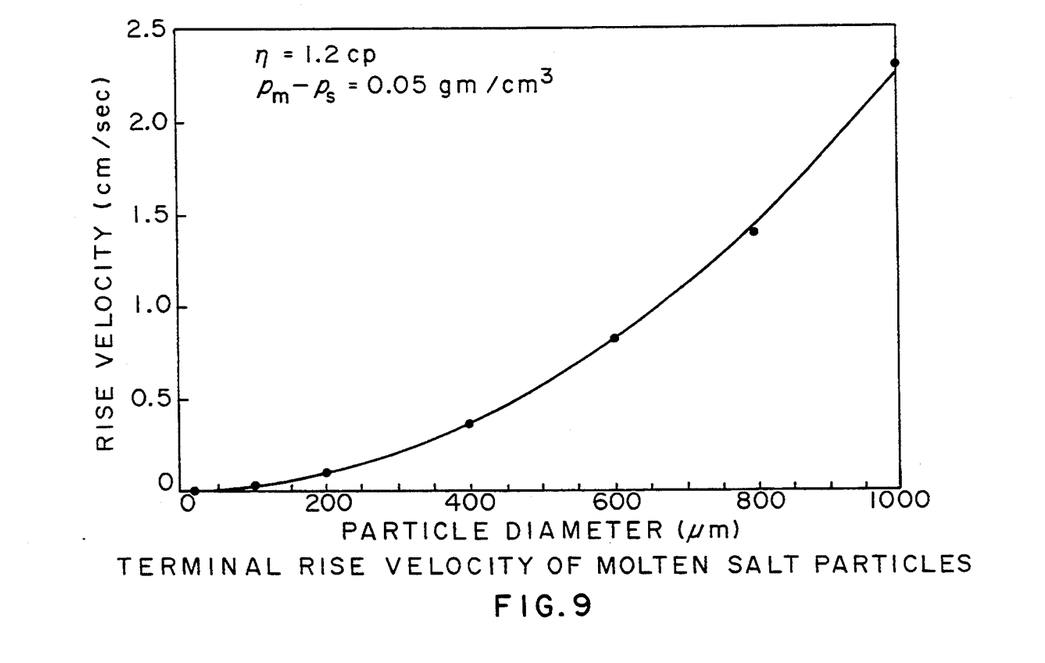
FIG. 9 is a graph showing the terminal rise velocity as a function of the particle diameter.

Referring in more detail to FIG. 9, the relationship between the particle diameter (measured in microns) plotted on the x-axis and the rise velocity of the particle (measured in cm/sec) plotted on the y-axis is shown. The values on this graph are calculated using Stokes Law, with the viscosity ($\eta$) of aluminum being equal to 1.2 cp and the density difference ($\rho m$-$\rho s$) between the aluminum and the liquid particle being 0.05 g/cm$^3$. FIG. 9 clearly shows that rise velocity increases substantially as the particle diameter becomes larger. As an example, assuming a coalesced liquid particle size of 1,000 $\mu$m, from FIG. 9, the rise velocity will be 2.3 cm/sec, As the rise velocity increases, the coalesced liquid particles will need less distance in the molten metal flow direction to rise to the surface of the molten metal in the settling zone 32 (FIG. 1).

While the foregoing description has emphasized the improvement as applied to treating molten aluminum, such is not necessarily intended to limit the scope of the improvement herein described which applies to the light metal magnesium and to other metals. While considerable emphasis has further been placed on passing the molten metal generally upwardly through the porous media and the liquid particles rising upwardly to the surface of the molten metal, the invention also encompasses passing the molten metal generally downwardly or generally laterally through the porous media and also encompasses the liquid particles being rendered gravity separable by sinking downwardly for subsequent removal from the molten metal passageway where the density of the particle phase is greater than the molten metal.

The benefit of the present invention is illustrated in the following examples.

EXAMPLE 1

A quantity of 10,000 lb. of aluminum alloy AA5182 was melted in a gas-fired furnace. Phosphate-bonded alumina foam media (30 PPI, 12"L×12"W×2"D) were used in both the upstream and downstream positions of a unit similar to FIG. 1. The alumina foam media had 30 PPI. The metal in the furnace was heated to approximately 1350° F. At some given time, the plug was removed from the furnace taphole and metal flowed from the furnace into a connecting trough and then into the unit. As soon as metal flow was begun, molten salt of composition 70% MgCl$_2$—30% NaCl was semi-continuously poured onto the metal surface and stirred in for dispersal with a graphite stirrer, the additions being made immediately upstream of the unit. Initially, no liquid salt particles were observed on the metal surface in the unit or downstream of the unit. After twenty-eight minutes of operation, large releases of liquid salt particles floated to the metal surface above the upstream media. Regular releases of liquid salt particles occurred throughout the remainder of the test. These liquid salt particles could be skimmed off the metal surface at this point. The test continued for approximately 1 hour at a flow rate of 7,000 lb./hr. This test demonstrated that the salt added and dispersed upstream of the invention was coalesced in the first media, was released from the media in a coalesced state and then floated to the surface of the molten metal in the settling zone. The salt was not carried downstream of the first media, so it did not end up in the final product. Inclusions samples were taken both upstream of the first media 24 and downstream of the second media 40, to demonstrate its ability to remove salt.

The procedure to take an inclusion sample was to pull molten aluminum, by a vacuum of approximately 25 in. of mercury, through a porous carbon disk. After approximately 0.5 to 1 kg of aluminum was passed through the porous carbon, the cartridge containing the porous carbon was removed from the metal being supplied and allowed to solidify. The porous carbon disk was then sectioned and examined metallographically. Any solid or liquid inclusion present in the metal were collected on the surface of the porous carbon disk.

Figure 10:
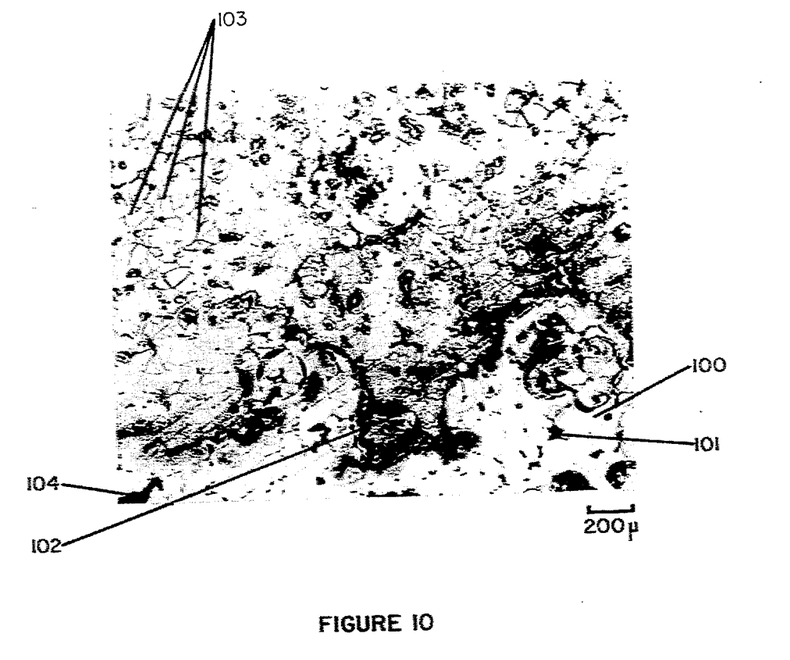
FIG. 10 is a photomicrograph (100×) of an inclusion sample taken upstream of the porous media for the first example.
Figure 11:
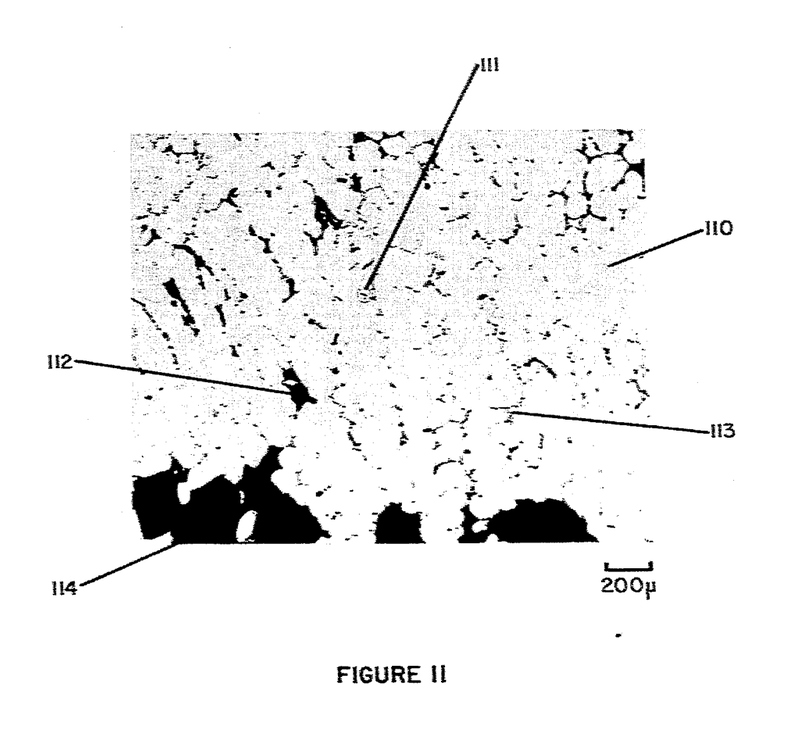
FIG. 11 is a photomicrograph (100×) of an inclusion sample taken downstream of the porous media for the first example.

FIG. 10 shows a photomicrograph of an inclusion sample taken upstream of the first media. The existence of round holes 101 in the metallic portion 100 of the sample, grey staining of the metal 102, and round rings 103 are the results of salt present in the sample. A portion of the carbon 104 from the inclusion sample cartridge can also be seen. The grey staining of the sample is the result of atmospheric moisture because of the hygroscopic nature of the salt present in the sample. FIG. 11 shows a photomicrograph of an inclusion sample taken downstream of the second media. The metallic portion 110 is relatively clean with little, if any, salt 111 present. The voids 112 in the sample are solidification, shrinkage cavities and, in addition, some constituent phase 113 can also be seen. The carbon 114 from the inclusion sample cartridge is also present in FIG. 11. No grey staining of the sample occurred, and round voids indicative of salt were not present. This metallographic analysis of inclusion samples indicates that the invention effectively removes salt particles from the stream of molten aluminum.

EXAMPLE 2

Figure 12:
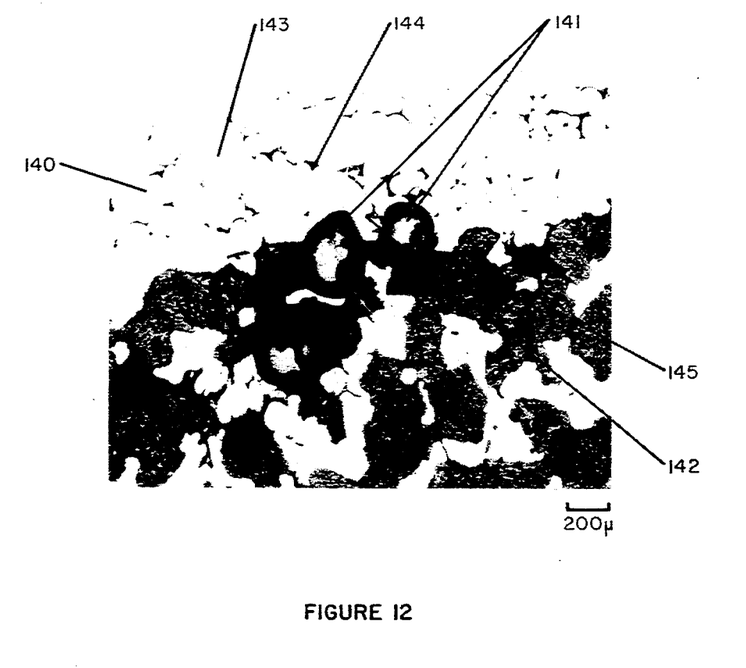
FIG. 12 is a photomicrograph (100×) of an inclusion sample taken upstream of the porous media for the second example.
Figure 13:
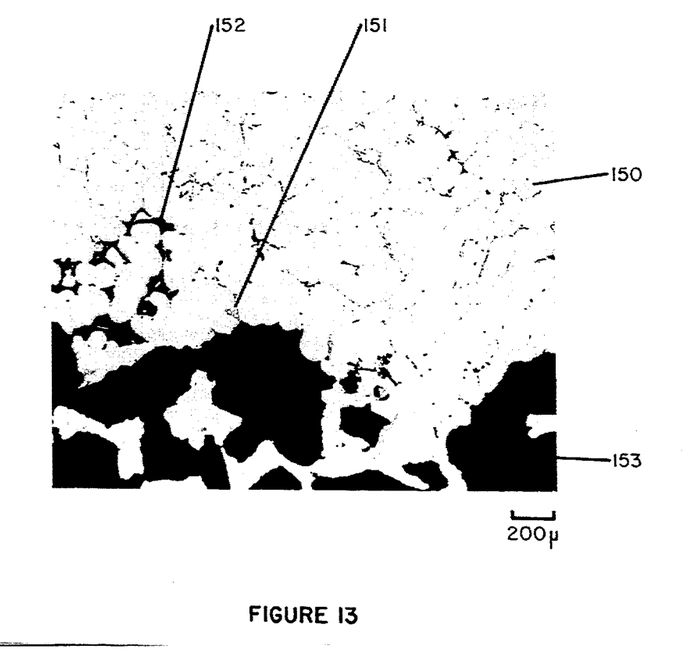
FIG. 13 is a photomicrograph (100×) of an inclusion sample taken downstream of the porous media for the second sample.

In a second example, conditions were the same as in Example 1 except mullite-bonded alumina media (1.5 in. thick) were used and the metal flow rate through the unit was 11,000 lb./hr. Releases of molten salt above the upstream media element were observed 19 minutes after salt additions upstream of the entire unit were begun. FIG. 12 is a photomicrograph of an inclusion sample taken upstream of the unit. The metallic portion 140 contains evidence of salt due to the condensed droplets of water 141 and the grey staining 142. Constituent metallic phase 143 and shrinkage cavities 144 are also present as well as the carbon 145 from the inclusion sample cartridge. FIG. 15 shows a photomicrograph of an inclusion sample taken downstream of the second media. Once again, there is little or no evidence of the presence of salt in the metallic portion 150. Constituent metallic phase 151 and shrinkage cavities 152 as well as the carbon 153 from the inclusion sample is shown.

The photomicrographs in FIGS. 10–13 show that the apparatus and the method of the invention are effective for removing molten salts from molten aluminum. While it will be appreciated that the examples have shown removal of molten salts from molten aluminum, the invention is not limited to molten aluminum and can be used with other light molten metals such as magnesium.

Next, a series of tests were performed to determine if the increased ability to remove liquid suspended particles from molten had an influence on the amount of solid suspended particles that could be filtered form the molten metal.

EXAMPLE 3 (PRIOR ART)

Aluminum alloy AA5083 was melted in a gas-fired furnace. Metal flowing from the furnace was purified in a gas chloridizing system. The system includes a gas dispersing unit located in the body of molten metal. The dispersing unit is a generally circular rotor or impeller which is rotated, and simultaneously therewith, a fluxing gas is added adjacent or in the region below the rotor. The fluxing gas is a chlorine and/or a non-reactive gas selected from the group consisting of argon and nitrogen gases and mixtures thereof. The amount of chlorine gas added to the metal was relatively low, in the range of about 0.5 to 10 SCFH (standard cubic feet per hour). This flow rate of fluxing gas is a typical flow rate for use in commercial fluxing of aluminum alloys. Next, the metal was filtered with phosphate-bonded alumina foam filter media, with the metal flowing in the standard direction, that is downward through the filter.

The cleanliness of the metal was rated before and after filtering by flowing the metal through a sampling cartridge. Cleanliness is a measure of the amount of non-metallic inclusions found in the metal such as $MgAl_2O_4$, $MgO$ and $Al_2O_3$. It is based on the number of inclusions seen across a leading edge of a porous graphite frit in the sampling cartridge. The rating scale ranged from 1 to 5. The rating system is set forth as follows:

1. Rating of 1 given to samples in which the metal is absolutely clean with no visible inclusions.
2. Rating of 2 given to samples in which inclusions are seen only occasionally on the porous graphite frit.
3. Rating of 3 given to samples in which inclusions are seen in many but not all pores at the leading edge of the porous graphite frit.
4. Rating of 4 given to samples in which inclusion clusters are found in every pore at the leading edge of the porous graphite frit.
5. Rating of 5 given to samples in which a continuous layer of inclusions are seen along the leading edge of the porous graphite frit.

The mean cleanliness level for the material of Example 3 is shown in the following Table.

TABLE

| Example | Number of Samples | Average Cleanliness Before Filter | Average Cleanliness After Filter | Improvement in Cleanliness |
|---|---|---|---|---|
| 3 | 5 | 2.83 | 2.40 | 0.43 |
| 4 | 8 | 3.25 | 3.25 | 0.00 |
| 5 | 14 | 2.79 | 2.43 | 0.36 |
| 6 | 8 | 3.31 | 2.56 | 0.75 |

EXAMPLE 4 (PRIOR ART)

The procedure of Example 3 was repeated except that the level of chlorine gas added to the metal was increased more than six-fold which is a flow rate that is much higher than the flow rates that are typically used in commercial fluxing of aluminum alloys. The mean cleanliness level for the material of Example 3 is shown on the Table.

A comparison of the cleanliness of Examples 3 and 4 reveal that there was no statistically significant change in cleanliness (solid inclusion level) associated with the increase in the level of the fluxing gas. The comparison of Examples 3 and 4 confirms the conventional wisdom in the art that increasing the flow rate of the fluxing gas to high levels will not reduce the level of solid contaminants in the metal.

EXAMPLE 5

The procedure of Example 3 was repeated except that the standard flow phosphate-bonded alumina foam filter media was replaced with a liquid particle removal system similar to that shown in FIGS. 1 and 2. The flow of metal was upward through the first stage and downward through the second stage. The mean cleanliness level for the material of Example 4 is shown on the Table.

A comparison of the cleanliness of Examples 3 and 5 reveal that there was no statistically significant change in cleanliness (solid inclusion levels) associated with the change in metal filtering steps at the low level of chlorine gas. The conventional wisdom in the art is that one would expect that a molten salt collector, which has tow filter stages, i.e. upward and downward flows, would reduce the level of solid contaminants in the metal to a level which is significantly below the level of the single stage filter of Example 3.

EXAMPLE 6

The procedure of Example 5 was repeated the level of chlorine gas added to the metal was increased more than six-fold which is a flow rate that is much higher than the flow rates that are typically used in commercial fluxing of aluminum alloys. The mean cleanliness level for the material of Example 6 is shown on the Table.

Surprisingly, a comparison of the cleanliness of Examples 4 and 6 reveal that there was statistically significant change in cleanliness (solid inclusion levels) associated with the change in metal filtering steps at the low level of chlorine gas. The ability of the molten salt collecting filter to remove solid contaminants (inclusions) from the molten metal at higher than typical levels of fluxing gas is unexpected. The conventional wisdom in the art is that one would expect the use of high levels of fluxing gas will have no positive influence on the performance of a downstream solid inclusion filter. Furthermore, those skilled in the art might expect that high levels of fluxing gas would have a negative effect on the performance of the filters. This expectation of a negative effect, is especially great in high magnesium aluminum alloys such AA5182, which is used in Examples 1 and 2, and AA5083 which is used in Examples 3–6.

While the invention has been described in terms of preferred embodiments, the claims appended hereto are intended to encompass all embodiments which fall within the spirit of the invention.

What is claimed is:

1. A method of treating molten metal containing solid particles suspended therein so as to reduce the number of said solid particles, said method comprising:
   treating said molten metal with a material, said treatment creating liquid salt particles in said molten metal, said liquid salt particles being suspended in said molten metal;
   passing said molten metal generally upwardly through a porous media so constructed and arranged such that said movement of said molten metal therethrough renders said suspended solid and liquid particles gravity separable so that said gravity separable particles can rise upwardly;
   moving said molten metal containing said gravity separable particles transversely through a settling zone wherein said gravity separable particles rise to a top surface of said molten metal so as to be removable from said molten metal; and
   passing said molten metal generally downwardly through a filter media spaced transversely from said settling zone to capture at least a portion of the suspended solid and liquid particles remaining in said molten metal that were not made gravity separable by passage through said porous media.

2. The method of claim 1 wherein said material is a chlorinaceous material.

3. The method of claim 1 wherein said material is a chlorinaceous material selected from the group consisting of magnesium chloride, lithium chloride, potassium chloride, sodium chloride and combinations thereof.

4. The method of claim 1 wherein said material is a fluoride containing material.

5. The method of claim 1 wherein said material is a fluoride material selected from the group consisting of calcium fluoride, magnesium fluoride, lithium fluoride, potassium fluoride, sodium fluoride, beryllium fluoride, aluminum fluoride, zirconium fluoride, silica fluoride, titanium fluoride, sulfur hexafluoride and combinations thereof.

6. The method of claim 1 wherein said treating said molten metal with a material includes:
   forming said material in-situ using a fluxing gas.

7. The method of claim 1 wherein said treating said molten metal with a material includes:
   treating said material with a salt which is intentionally added to the molten metal.

8. The method of claim 1 wherein:
   said gravity separable particles are mixtures of said solid and said liquid particles.

9. The method of claim 1 wherein:
   said settling zone has sufficient length in relation to the velocity of the molten metal in said settling zone and the depth of said settling zone to allow said gravity separable particles to float to said top surface of said molten metal in said settling zone as said molten metal moves through said settling zone.

10. A method of treating molten metal containing suspended solid particles and suspended liquid particles, said method comprising:
    passing said molten metal containing said suspended solid and said suspended liquid particles through a porous media so constructed and arranged such that said movement of said molten metal therethrough renders said suspended particles gravity separable, whereby said gravity separable particles rise upwardly or settle downwardly so as to be removable from said molten metal.

11. The method of claim 10 wherein:
    said gravity separable particles are mixtures of said solid and said liquid particles.

12. The method of claim 10 wherein:
    said liquid particles are formed from halide salts.

13. The method of claim 10 wherein:
    said liquid particles are formed from halide, selected from the group consisting of magnesium chloride, lithium chloride, potassium chloride, sodium chloride, calcium fluoride, magnesium fluoride, lithium fluoride, potassium fluoride, beryllium fluoride, aluminum fluoride, zirconium fluoride, silica fluoride, titanium fluoride, sulfur hexafluoride, potassium bromide, sodium bromide and combinations thereof.

14. The method of claim 10 wherein:
    said porous media is wettable by said suspended liquid particles.

15. The method of claim 10 wherein:
    said molten metal is contained in a molten metal passageway having an inlet portion upstream of said porous media and a settling zone downstream of said inlet portion; and
    said settling zone having sufficient length in relation to the velocity of the molten metal in said settling zone and the depth of said settling zone to allow said gravity separable particles to float to the top surface of said molten metal in said settling zone as said molten metal moves through said settling zone.

16. The method of claim 10 including:

after passing said molten metal through said porous media, passing said molten metal through a filter media to capture suspended liquid particles remaining in said molten metal.

17. The method of claim 10 including:
after passing said molten metal through said porous media, passing said molten metal through a filter media to capture suspended liquid particles remaining in said molten metal.

18. A method of treating molten metal containing suspended solid and liquid particles, said method comprising:
passing said molten metal containing said suspended liquid particles generally upwardly through a porous media so constructed and arranged to facilitate coalescence of said solid and liquid particles on said porous media; and
carrying said coalesced particles out of said porous media by sufficient molten metal velocity and by creating coalesced particles having increased buoyancy over said suspended particles.

19. The method of claim 18 wherein:
said coalesced particles are mixtures of said solid and said liquid particles.

20. The method of claim 18 wherein:
said liquid particles are formed from halide salts.

21. The method of claim 18 wherein:
said liquid particles are formed from halide, selected from the group consisting of magnesium chloride, lithium chloride, potassium chloride, sodium chloride, calcium fluoride, magnesium fluoride, lithium fluoride, potassium fluoride, beryllium fluoride, aluminum fluoride, zirconium fluoride, silica fluoride, titanium fluoride, sulfur hexafluoride, potassium bromide, sodium bromide and combinations thereof.

* * * * *